United States Patent
Haneda et al.

(10) Patent No.: US 6,957,273 B2
(45) Date of Patent: Oct. 18, 2005

(54) PACKET TRANSMITTING/RECEIVING METHOD AND APPARATUS FOR COMPUTER SYSTEM

(75) Inventors: Terumasa Haneda, Yokohama (JP); Hiroshi Matsushita, Wakoh (JP); Makoto Takamatsu, Yokohama (JP); Yuji Hanaoka, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 772 days.

(21) Appl. No.: 09/725,672

(22) Filed: Nov. 30, 2000

(65) Prior Publication Data

US 2001/0023465 A1 Sep. 20, 2001

(30) Foreign Application Priority Data

Mar. 3, 2000 (JP) ........................................ 2000-058317

(51) Int. Cl.⁷ ........................ G06F 15/173; G06F 15/16; H04J 3/22; H04J 3/16
(52) U.S. Cl. ........................ 709/240; 709/253; 370/472; 370/437
(58) Field of Search .................................. 709/240, 253; 370/472, 437, 60, 331, 397, 412, 429; 714/30; 711/151; 710/260

(56) References Cited

U.S. PATENT DOCUMENTS

| | | | | |
|---|---|---|---|---|
| 5,140,584 A | * | 8/1992 | Suzuki | 370/235 |
| 6,125,110 A | * | 9/2000 | Proctor et al. | 370/331 |
| 6,185,221 B1 | * | 2/2001 | Aybay | 370/412 |
| 6,345,345 B1 | * | 2/2002 | Yu et al. | 711/151 |
| 6,463,071 B1 | * | 10/2002 | Araujo et al. | 370/437 |
| 6,483,845 B1 | * | 11/2002 | Takeda et al. | 370/429 |
| 6,601,189 B1 | * | 7/2003 | Edwards et al. | 714/30 |
| 6,604,161 B1 | * | 8/2003 | Miller | 710/260 |
| 6,704,316 B1 | * | 3/2004 | He | 370/397 |

* cited by examiner

*Primary Examiner*—John Follansbee
*Assistant Examiner*—Philip Lee
(74) *Attorney, Agent, or Firm*—Staas & Halsey LLP

(57) ABSTRACT

Priorities are set in order of an internal register access packet, a response system packet, and a command system packet which are transmitted/received by a packet transmitting/receiving unit. In a transfer waiting state of the command system packet of the low priority to a certain transmission destination, in the case where the response system packet or internal register access packet of the high priority to another transmission destination is received from an external module, the packet transmitting/receiving unit withdraws the transfer waiting state and transmits the packet of the high priority.

6 Claims, 13 Drawing Sheets

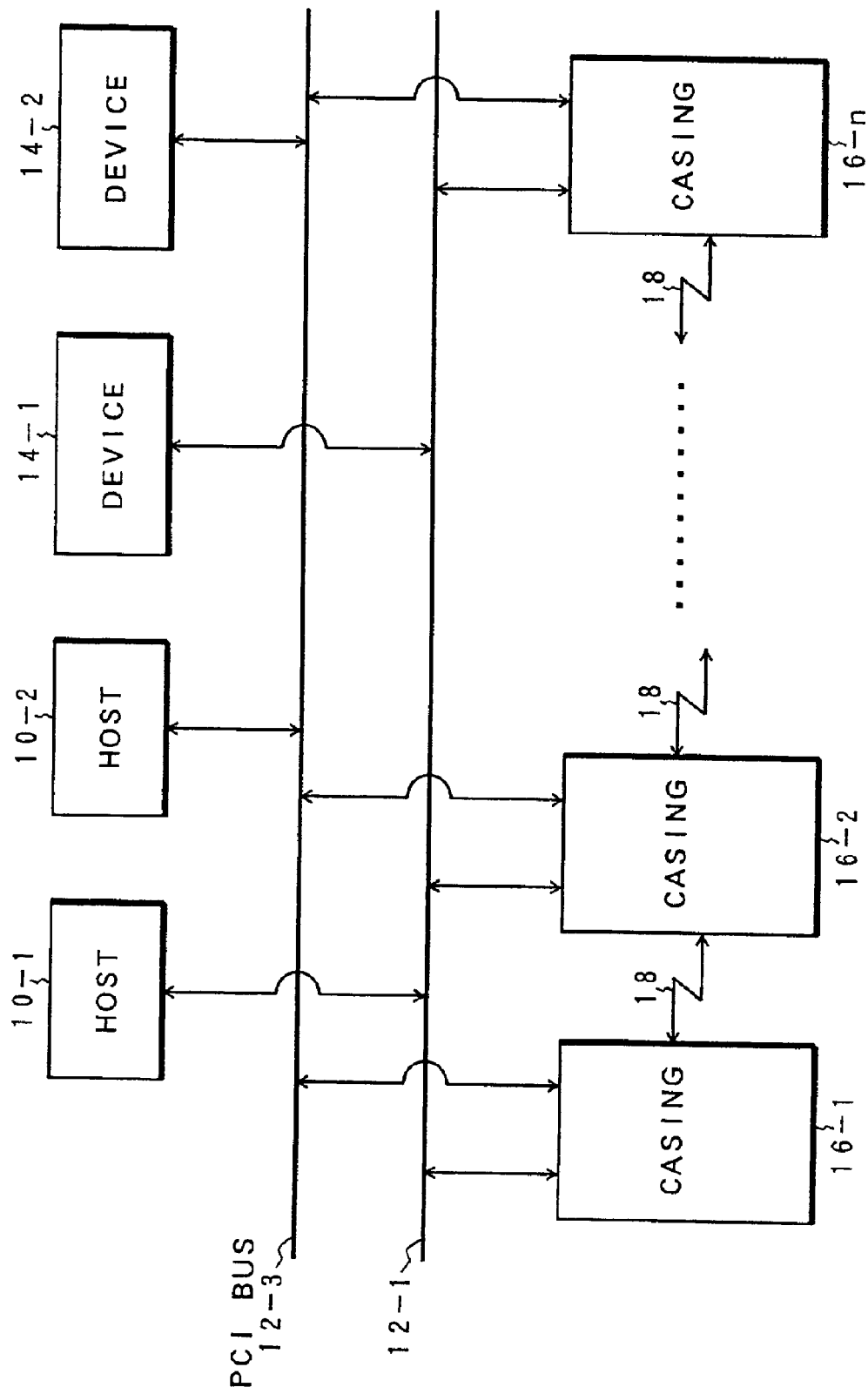

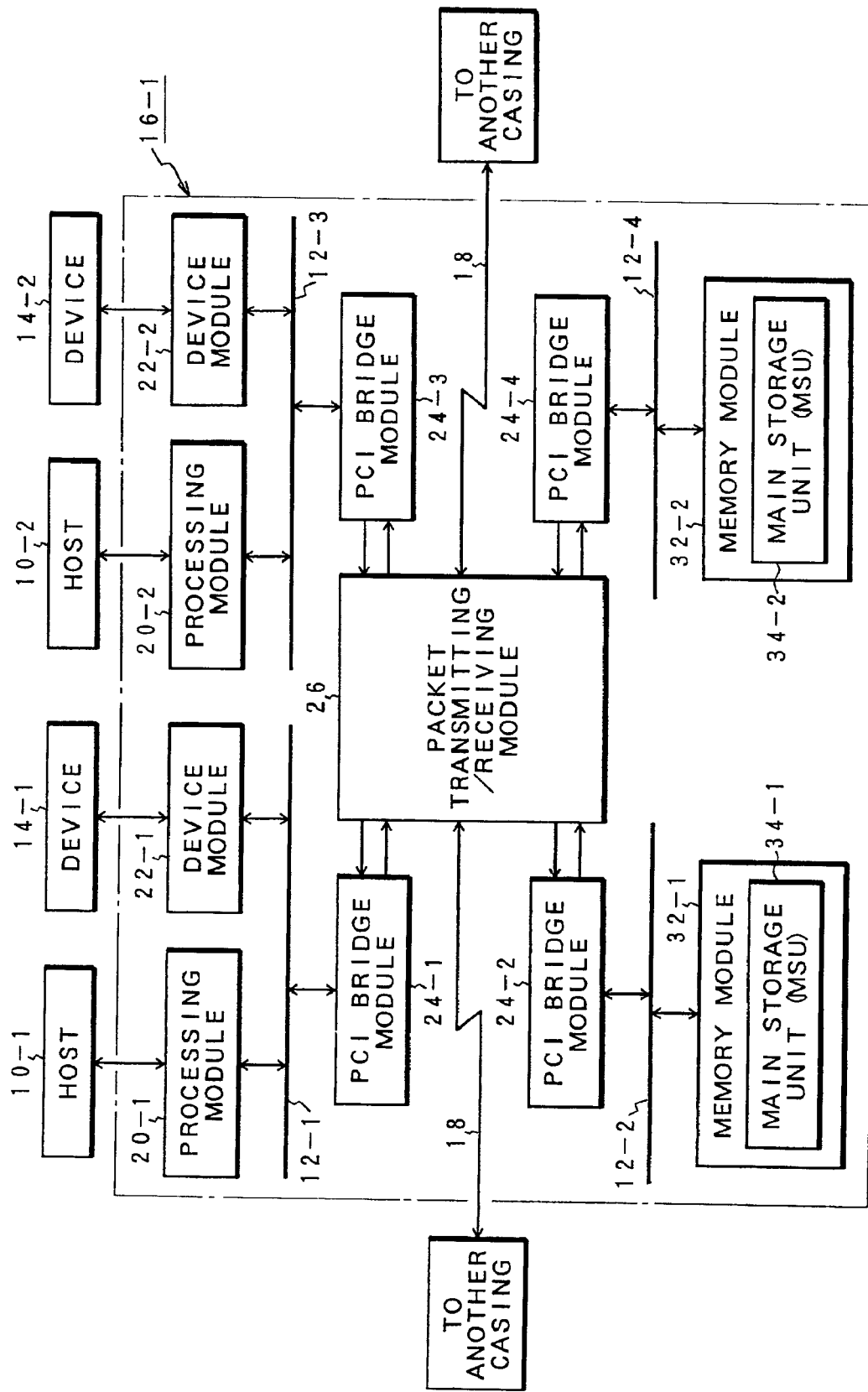

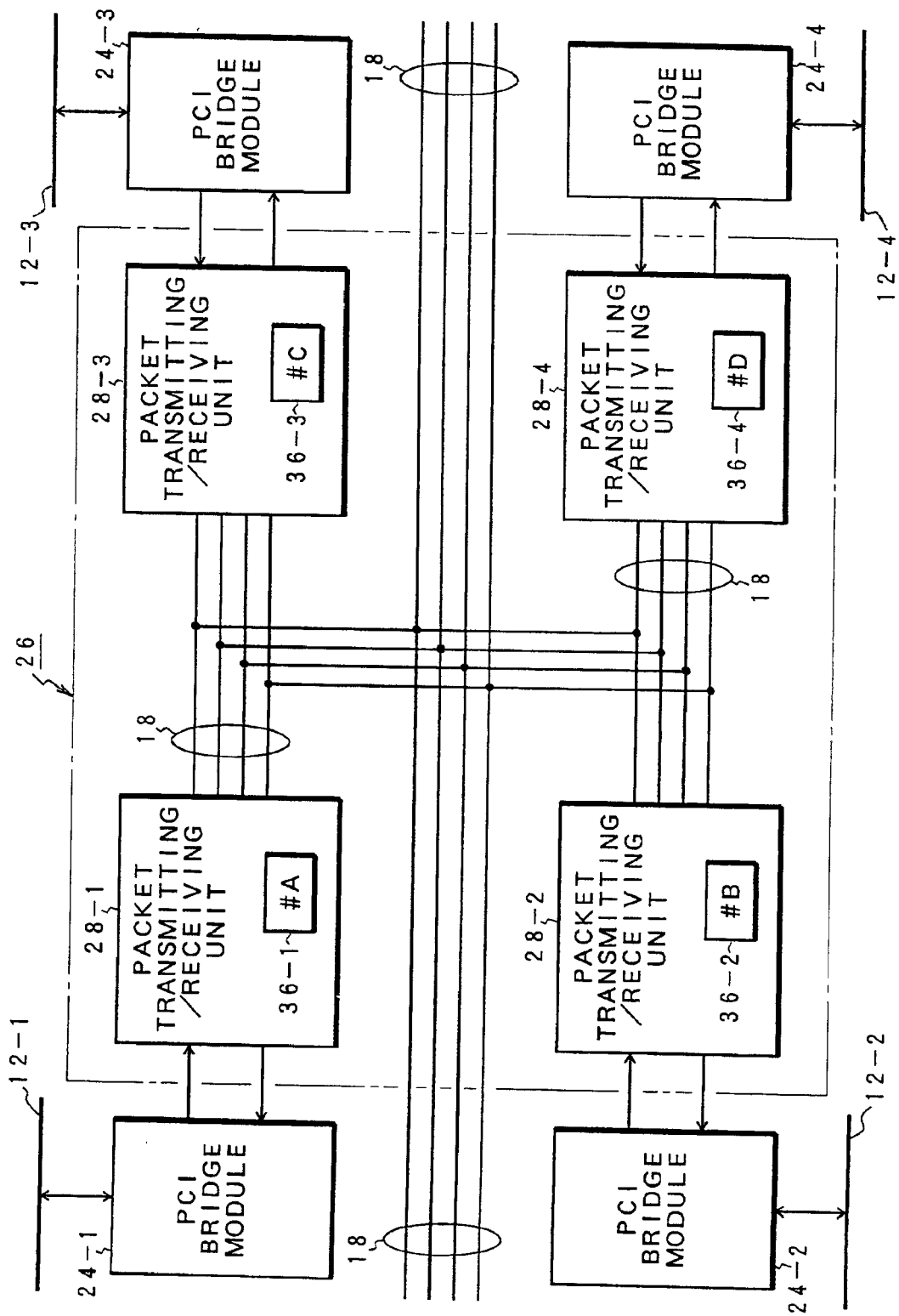

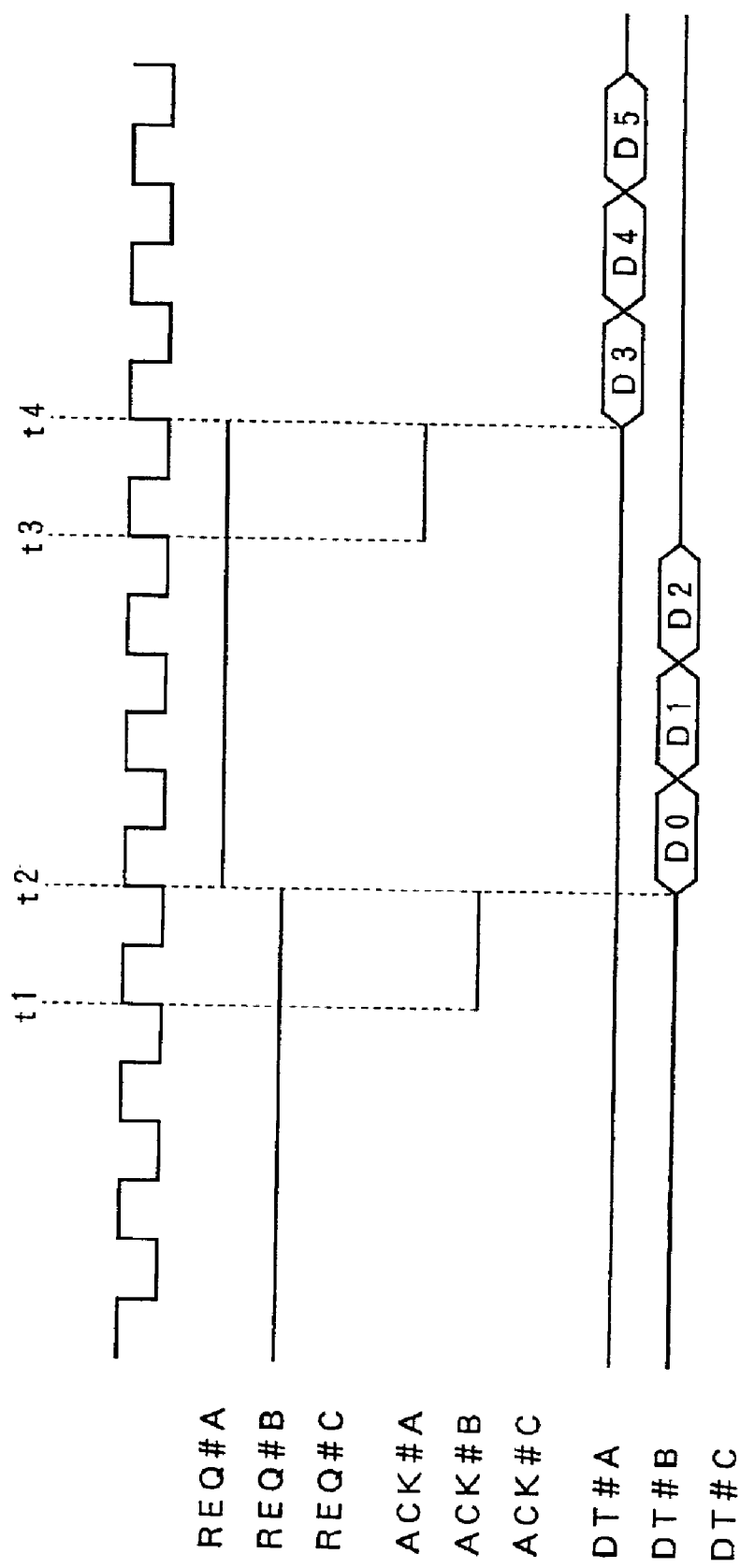

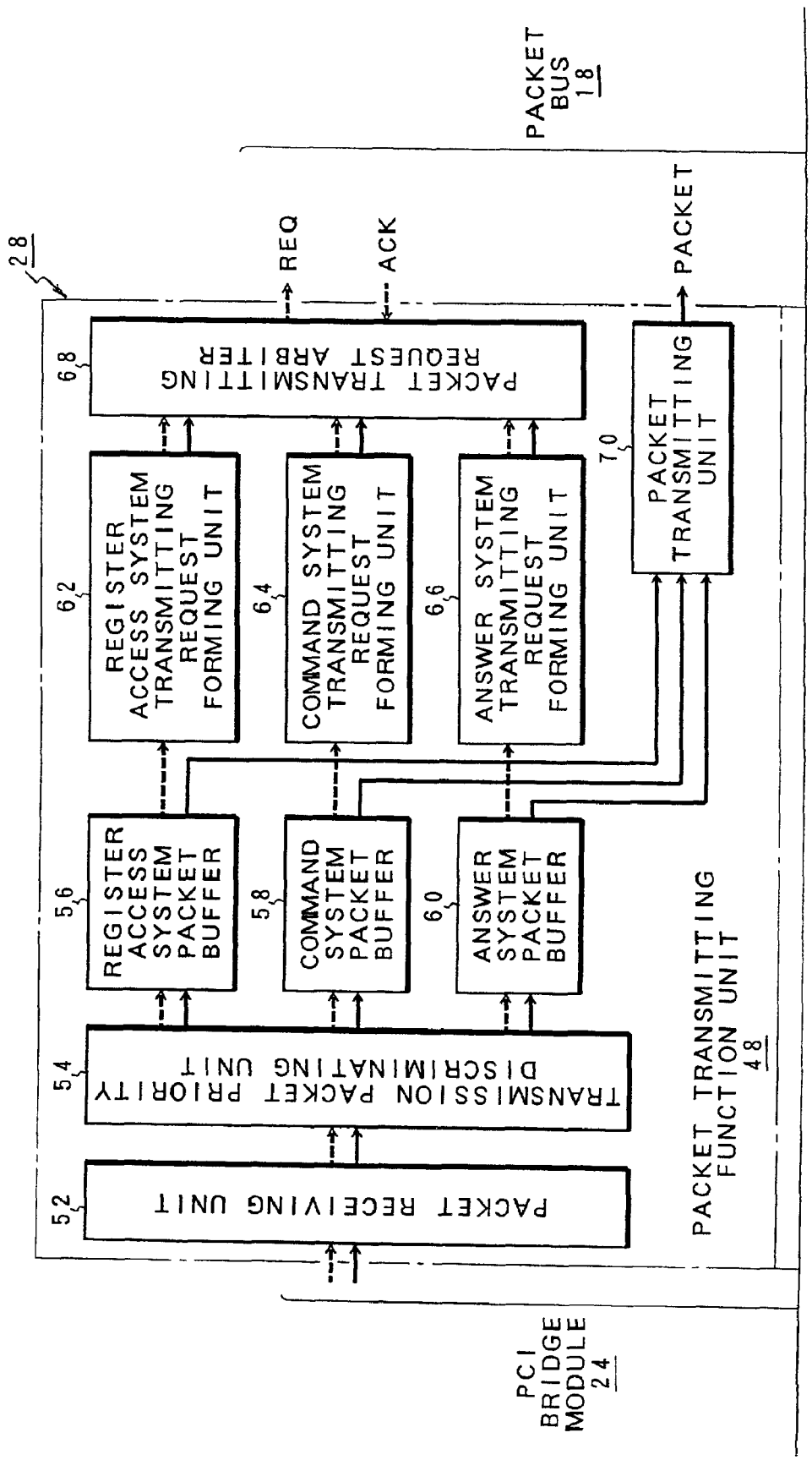

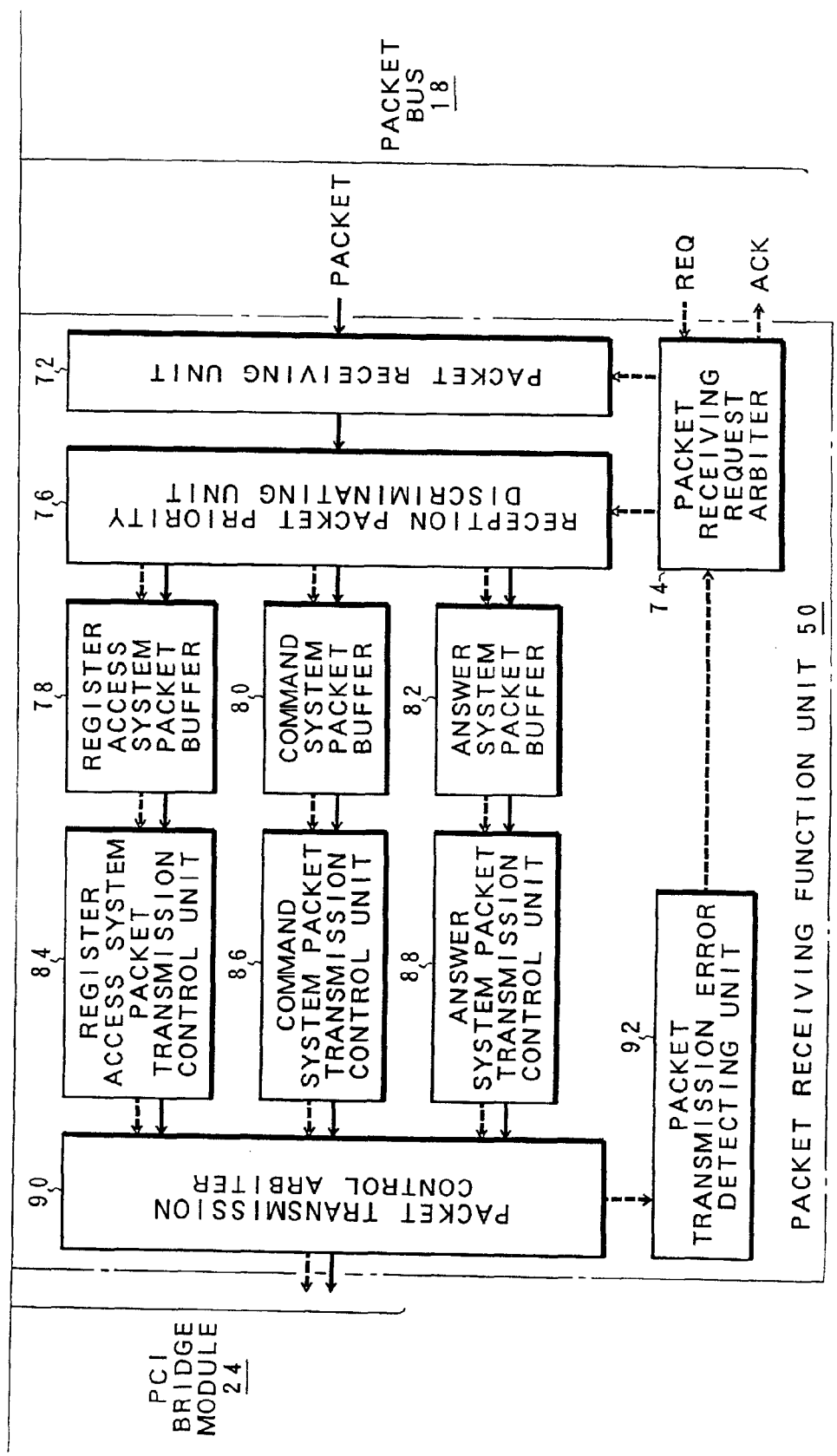

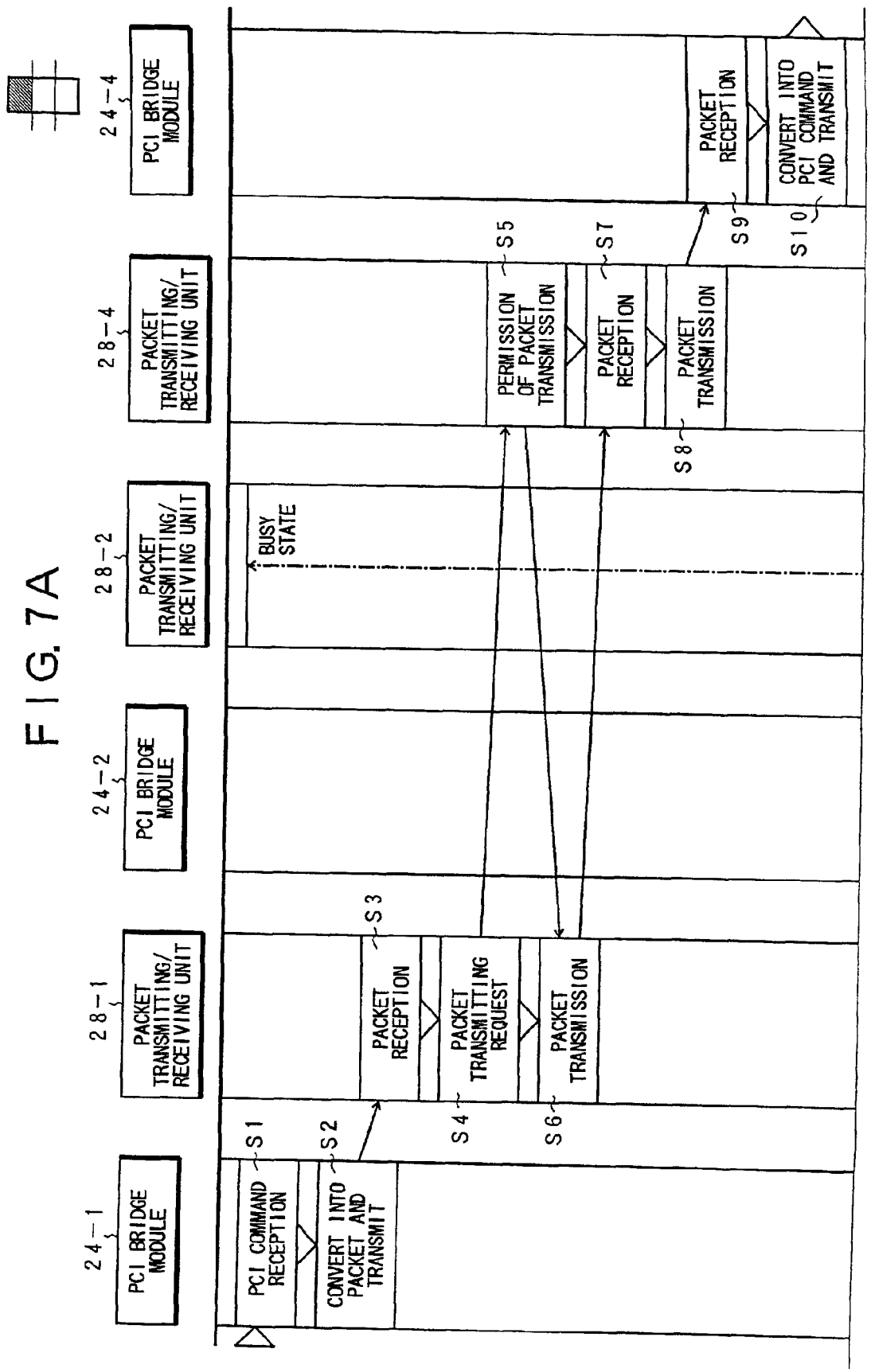

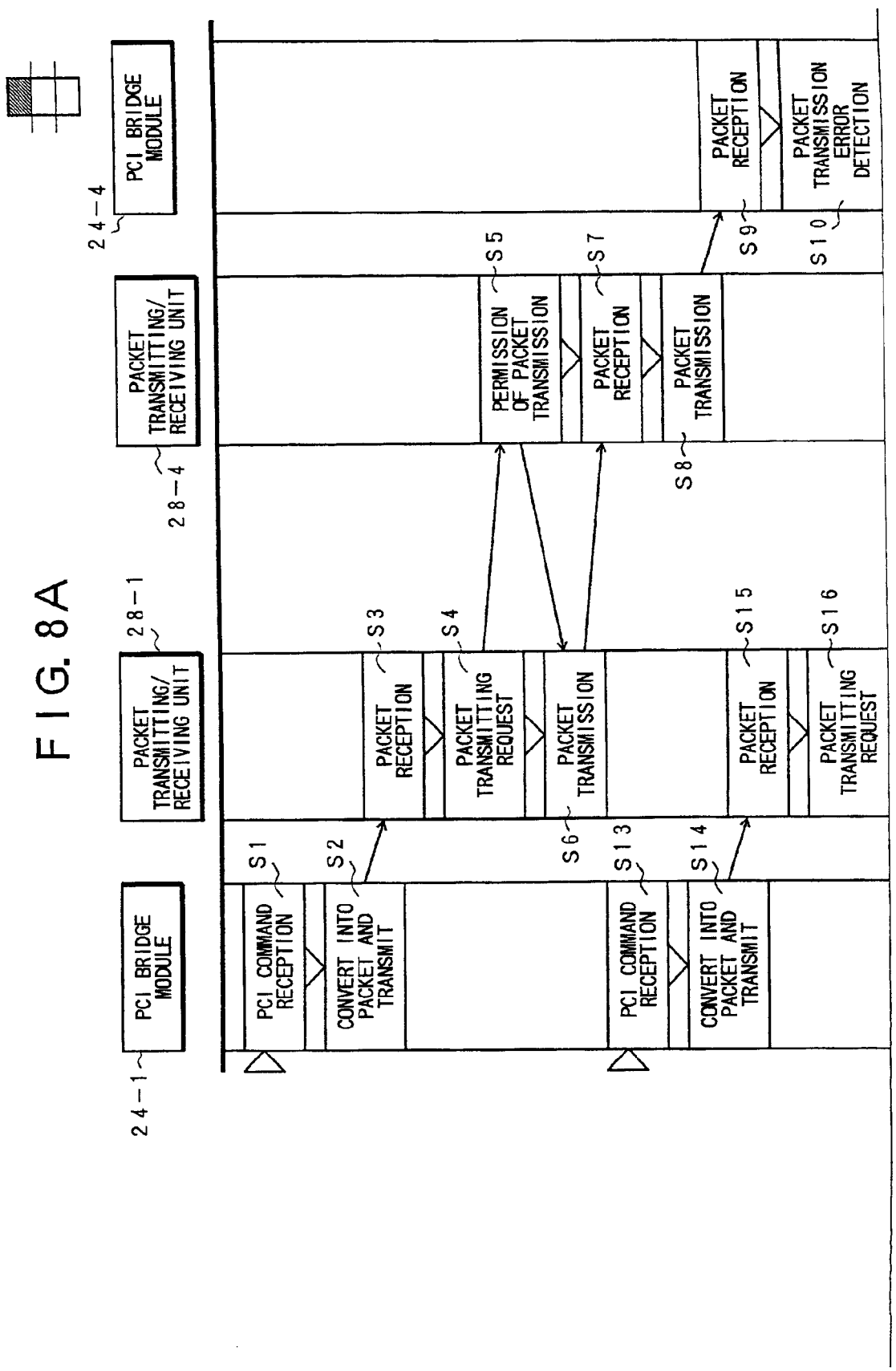

PACKET TRANSMITTING/RECEIVING METHOD AND APPARATUS FOR COMPUTER SYSTEM

BACKGROUND OF THE INVENTION

1. Field of the Invention

The present invention relates to packet transmitting/receiving apparatus and method for a computer system for transmitting a command between modules such as host, memory, input/output devices, and the like. More particularly, the invention relates to packet transmitting/receiving method and apparatus for a computer system, in which even in a packet transfer waiting state, with respect to a packet having a high priority, the transfer waiting state is withdrawn, thereby enabling such a packet to be preferentially transferred.

2. Description of the Related Arts

Hitherto, in a computer system in which a host, a memory unit functioning as a main storage, and input/output devices are distributed and arranged, the host, memory unit, and input/output devices are connected by a PCI bus (Peripheral Component Interconnect bus) known as a high speed extension bus. On the other hand, in association with the improvement of processing performance and the realization of a high processing speed of a CPU in recent years, a system in which the host, memory unit, and input/output devices connected to the PCI bus are connected by a packet network (packet bus) has been proposed.

FIG. 1 is a schematic diagram of a computer system using packet transmission/reception. Hosts 110-1 and 110-3 are connected to PCI buses 108-1 and 108-3 by PCI modules 112-1 and 112-3, respectively. The PCI buses 108-1 and 108-3 are connected to a packet transmitting/receiving module 100 by PCI bridge modules 106-1 and 106-3, respectively. Memory modules 114-2 and 114-4 each functioning as a main storage are connected to other PCI buses 108-2 and 108-4. The PCI buses 108-2 and 108-4 are also connected to the packet transmitting/receiving module 100 via PCI bridge modules 106-2 and 106-4. The transmitting/receiving module 100 has packet transmitting/receiving units 102-1, 102-2, 102-3, and 102-4 and they are connected by a packet bus 104. The operation of the computer system is performed, for example, as follows. When the host 110-1 generates, for example, a write command, the PCI module 112-1 transfers the write command (including a command code, an address, and data) to the bridge module 106-1. When the transfer through the bus is completed, the PCI bridge module 106-1 converts the write command into a packet and transfers such a write packet from the packet transmitting/receiving unit 102-1 of the packet transmitting/receiving module 100 to, for example, the packet transmitting/receiving unit 102-4 on the memory module 114-4 side. The packet received by the packet transmitting/receiving unit 102-4 is converted into a PCI write command by the PCI bridge module 106-4 and transferred to the memory module 114-4 through the PCI bridge module 112-4 by the PCI bus 108-4, thereby writing data. The packet transfer in the packet transmitting/receiving module 100 is performed as follows. The packet transmitting/receiving unit 102-1 as a transmitting source first generates a transmitting request to the packet transmitting/receiving unit 102-4 as a transmission destination. When transmission permission is obtained, the unit 102-1 transmits the packet. When the transmission permission is not obtained, the unit 102-1 enters a transfer waiting state with the transmission packet stored in a buffer. When the buffer is full in the transfer waiting state, the packet reception from the PCI bridge module 106-1 is inhibited. When the packet transmitting/receiving unit 102-4 on the transmission destination side receives the transmitting request from the packet transmitting/receiving unit 102-1, there is an empty space in the buffer. If there is no error in the external PCI bridge module 106-4, the unit 102-4 is in a packet receivable state. Accordingly, the unit makes a response of the transmission permission and receives the packet. On the contrary, when the buffer of the packet transmitting/receiving unit 102-4 is full or the unit 102-4 is in a packet unreceivable state due to an error caused by a failure or the like of the PCI bridge module 106-4, a response of the transmission permission is inhibited. In correspondence to the stop of the response regarding the transmission permission, the packet transmitting/receiving unit 102-4 on the transmission destination side enters the transfer waiting state.

However, in such a packet transmission/reception, in the case where the transmitting request is issued to a specific packet transmitting/receiving unit and an acknowledgment response is not obtained and the unit enters the transfer waiting state, even if another packet transmitting/receiving unit is in the receivable state, all of the packet transfer operations are obstructed in the transfer waiting state, so that the packet transmitting/receiving function is impeded. Particularly, when the packet which entered the transfer waiting state is a response packet (replay packet) after a command system packet is transferred, a packet sequence enters a transfer waiting state on the halfway, so that it results in a serious factor of deteriorating processing performance of the packet transfer. When the PCI bridge module 106-4 externally connected to the packet transmitting/receiving unit 102-4 on the transmission destination side can not obtain the acknowledgment response due to an error such as a failure of hardware or the like, the transfer waiting state of the packet transmitting/receiving unit 102-1 on the transmitting source side is not cancelled, so that such a problem that the unit is hung up also occurs.

SUMMARY OF THE INVENTION

According to the invention, there are provided packet transmitting/receiving method and apparatus for a computer system having high reliability, in which even in a transfer waiting state, a packet having a high priority can be transferred, packet transferring performance is improved, and a hang-up at the time of a hardware error can be avoided.

According to the packet transmitting/receiving method for the computer system of the invention, a plurality of packet transmitting/receiving units provided in correspondence to external modules such as PCI bridge modules and the like are connected via a packet bus. When each of the packet transmitting/receiving units transmits a packet received from the external module to another packet transmitting/receiving unit, each unit generates a transmitting request to the transmission destination. When a transmission permission is obtained, the unit transmits the packet. When the transmission permission is not obtained, the unit enters a transfer waiting state with the transmission packet stored in a buffer. Further, when the buffer is full in the transfer waiting state, the packet reception from the external module is inhibited. When the transmitting request is received from another packet transmitting/receiving unit, if the unit is in a packet receivable state, the unit makes a response of the transmission permission and receives the packet. When the unit is in a packet unreceivable state, the reply of the transmission permission is inhibited.

According to the invention, such a packet transmitting/receiving method for the computer system is characterized in that priorities are set in order of a packet for an internal register access (hereinbelow, referred to as an internal register access packet), a response system packet, and a command system packet which are transmitted/received by the packet transmitting/receiving unit, and in the transfer waiting state of the command system packet of the low priority to a certain transmission destination, when the packet transmitting/receiving unit receives the response system packet of the high priority to another transmission destination from an external module, the transfer waiting state is withdrawn and the response system packet of the high priority is transmitted. Therefore, in the case where the packet transmitting/receiving unit transmits a command system packet, does not obtain an acknowledgment response, enters the transfer waiting state, and receives a response system packet to another packet transmitting/receiving unit from the external module in the transfer waiting state, the transfer waiting state is forcedly withdrawn, a transferring request of the response system packet can be performed, and the response system packet can be preferentially transferred without being obstructed by the transfer waiting state, so that a deterioration in processing performance of the packet transfer is prevented.

According to another embodiment of the invention, there is provided a similar packet transmitting/receiving method for a computer system, wherein priorities are similarly set in order of an internal register access packet, a response system packet, and a command system packet which are transmitted/received by a packet transmitting/receiving unit, and in a transfer waiting state of the command system packet of the low priority to a certain transmission destination, when the packet transmitting/receiving unit receives the internal register access packet having the highest priority to the same transmission destination, the unit withdraws the transfer waiting state and transmits the internal register access packet having the highest priority. In a response inhibiting state of the transmission permission due to an error detection of an external module, when the packet transmitting/receiving unit on the transmission destination side receives a transmitting request of the internal register access packet having the highest priority from another packet transmitting/receiving unit, the unit makes a response of the transmission permission, receives the internal register access packet, and returns an error detail information packet indicative of an error state of the external module. In this case, after the packet transmitting request is received, the packet transmitting request is withdrawn and when the packet transmitting request is subsequently issued again, the packet transmitting/receiving unit in the response inhibiting state of the transmission permission due to the error detection determines that the request is the transmitting request of the internal register access packet having the highest priority, and makes a response of the transmission permission. Accordingly, when the external module connected to the packet transmitting/receiving unit on the transmission destination side cannot obtain the acknowledgment response due to an error such as a hardware failure or the like, an error situation can be recognized by transmitting the internal register access packet for collecting error information, for example, an error read packet from the transmitting source, thereby preventing a hang-up which is caused by such a fact that the error situation cannot be recognized.

According to another modification of the invention, a general packet transmitting/receiving method in which the kind of packet is not specified is provided. In this case, a priority is set in accordance with the kind of packet which is transmitted/received by the packet transmitting/receiving unit. In the transfer waiting state of a packet of the low priority to a certain transmission destination, when the packet transmitting/receiving unit receives a packet of the high priority to another transmission destination from an external module, the unit withdraws the transfer waiting state and transmits the packet of the high priority. According to the invention, in the case where a priority is set in accordance with the kind of packet which is transmitted/received by the packet transmitting/receiving unit and, in the transfer waiting state of a packet of the low priority to a certain transmission destination, the packet transmitting/receiving unit receives a packet having the highest priority to the same transmission destination from the external module, the unit withdraws the transfer waiting state and transmits the packet having the highest priority. In a response inhibiting state of the transmission permission caused by an error of the external module, only in the case where the packet transmitting/receiving unit on the transmission destination side receives a transmitting request of the packet having the highest priority, the unit makes a response of the transmission permission, receives the packet, and returns an error information packet of the external module. Also in this case, after the packet transmitting request is received in the response inhibiting state of the transmission permission caused by the error of the external module, if the packet transmitting request is withdrawn and the packet transmitting request is subsequently issued again, the packet transmitting/receiving unit on the transmission destination side determines that the request is the transmitting request of the packet having the highest priority, and makes a response of the transmission permission.

According to the invention, there is further provided a packet transmitting/receiving apparatus for a computer system. The packet transmitting/receiving apparatus of the invention connects a plurality of packet transmitting/receiving units provided in correspondence to external modules via a packet bus. Each of the packet transmitting/receiving units has a packet transmitting function unit and a packet receiving function unit. When a packet is transmitted to another packet transmitting/receiving unit, the packet transmitting function unit issues a transmitting request to the unit of the transmission destination. When a transmission permission is obtained, the unit transmits the packet and, when the transmission permission is not obtained, the unit enters a transfer waiting state with the transmission packet stored in a buffer. When the buffer is full in the transfer waiting state, the unit inhibits the reception of a packet from the external module. When the transmitting request is received from another packet transmitting/receiving unit, if the packet receiving function unit is in a packet receivable state, the unit makes a response of the transmission permission and receives the packet. When the unit is in a packet unreceivable state, the unit inhibits a response of the transmission permission. According to the invention, the packet transmitting function unit further has a transmission packet priority discriminating unit and a packet transmitting request arbiter. The transmission packet priority discriminating unit discriminates the priorities of the packets which are received from the external module and have been set in order of the internal register access packet, response system packet, and command system packet and stores them into different buffers. In the transfer waiting state of the command system packet of the low priority to a certain transmission destination, when the response system packet of the high priority to another transmission destination is received from the external module, the packet transmitting request arbiter withdraws the transfer waiting state and transmits the response system packet of the high priority. Consequently, in the case where the command system packet is transmitted, the unit enters the transfer waiting state because the acknowledgment response is not obtained, and the response system packet to another packet transmitting/receiving unit is received from the external module in the transfer waiting state, the transfer waiting state is forcedly withdrawn and the transfer request of the response system packet can be issued. The response system packet is preferentially transferred without being obstructed by the transfer waiting state, so that a deterioration in processing performance of the packet transfer can be prevented.

According to another embodiment of the invention, the packet transmitting function unit of the packet transmitting/receiving unit has: a transmission packet priority discriminating unit for discriminating the priorities of the packets which are received from another packet transmitting/receiving unit and have been set in order of the internal register access packet, response system packet, and command system packet and storing them into different buffers; and a packet transmitting request arbiter for, in a transfer waiting state of the command system packet of the low priority to a certain transmission destination, when the internal register access packet having the highest priority to the same transmission destination is received from the external module, withdrawing the transfer waiting state and transmitting the response system packet of the high priority. Simultaneously, the packet receiving function unit of the packet transmitting/receiving unit has: a reception packet priority discriminating unit for discriminating the priorities of the packets which are received from another packet transmitting/receiving unit and have been set in order of the internal register access packet, response system packet, and command system packet and storing them into different buffers; and a packet receiving request arbiter for, in a response inhibiting state of the transmission permission caused by an error in the external module, only when a transmitting request of the internal register access packet having the highest priority is received, making a response of the transmission permission, receiving the internal register access packet, and returning an error detail information packet indicative of an error state of the external module. In this case, in the response inhibiting state of the transmission permission caused by the error of the external module, after the packet transmitting request is received from another packet transmitting/receiving unit, when the packet transmitting request is withdrawn and the packet transmitting request is subsequently sent again, the packet receiving request arbiter determines that the request is the transmitting request of the internal register access packet having the highest priority, and makes a response of the transmission permission. Accordingly, when the acknowledgment response is not obtained due to an error such as a hardware failure or the like in the external module connected to the packet transmitting/receiving unit on the transmission destination side, the error situation can be recognized by transmitting the internal register access packet, for example, an error read packet for collecting error information from the transmitting source, thereby preventing a hang-up that is caused by such a fact that the error situation cannot be recognized. The external module of the packet transmitting/receiving apparatus of the invention is a PCI bridge module for performing the conversion between a command of the PCI bus and the packet. The modules such as host, input/output devices, memory, and the like are connected to the PCI bus of the PCI bridge through the PCI modules.

The above and other objects, features, and advantages of the present invention will become more apparent from the following detailed description with reference to the drawings.

BRIEF DESCRIPTION OF THE DRAWINGS

FIG. 2 is a block diagram of a computer system to which the invention is applied;

FIG. 3 is a block diagram of an internal construction of a packet transfer module in FIG. 2;

FIG. 4 is a block diagram of a functional construction of a packet transmitting/receiving unit in FIG. 3;

FIG. 5 is a time chart for a transmitting request, an acknowledgment response, and a packet data transfer by the packet transmitting/receiving unit in FIG. 3;

FIGS. 6A and 6B are block diagrams showing the details of the packet transmitting/receiving unit in FIG. 4;

FIGS. 7A, 7B, and 7C are explanatory diagrams of a sequence of a packet transferring process of the invention for preferentially transferring an answer system packet according to the invention; and FIGS. 8A, 8B, and 8C are explanatory diagrams of a sequence of a packet transferring process of the invention for preferentially transferring a packet for internal register access according to the invention.

DETAILED DESCRIPTION OF THE PREFERRED EMBODIMENT

Figure 1:
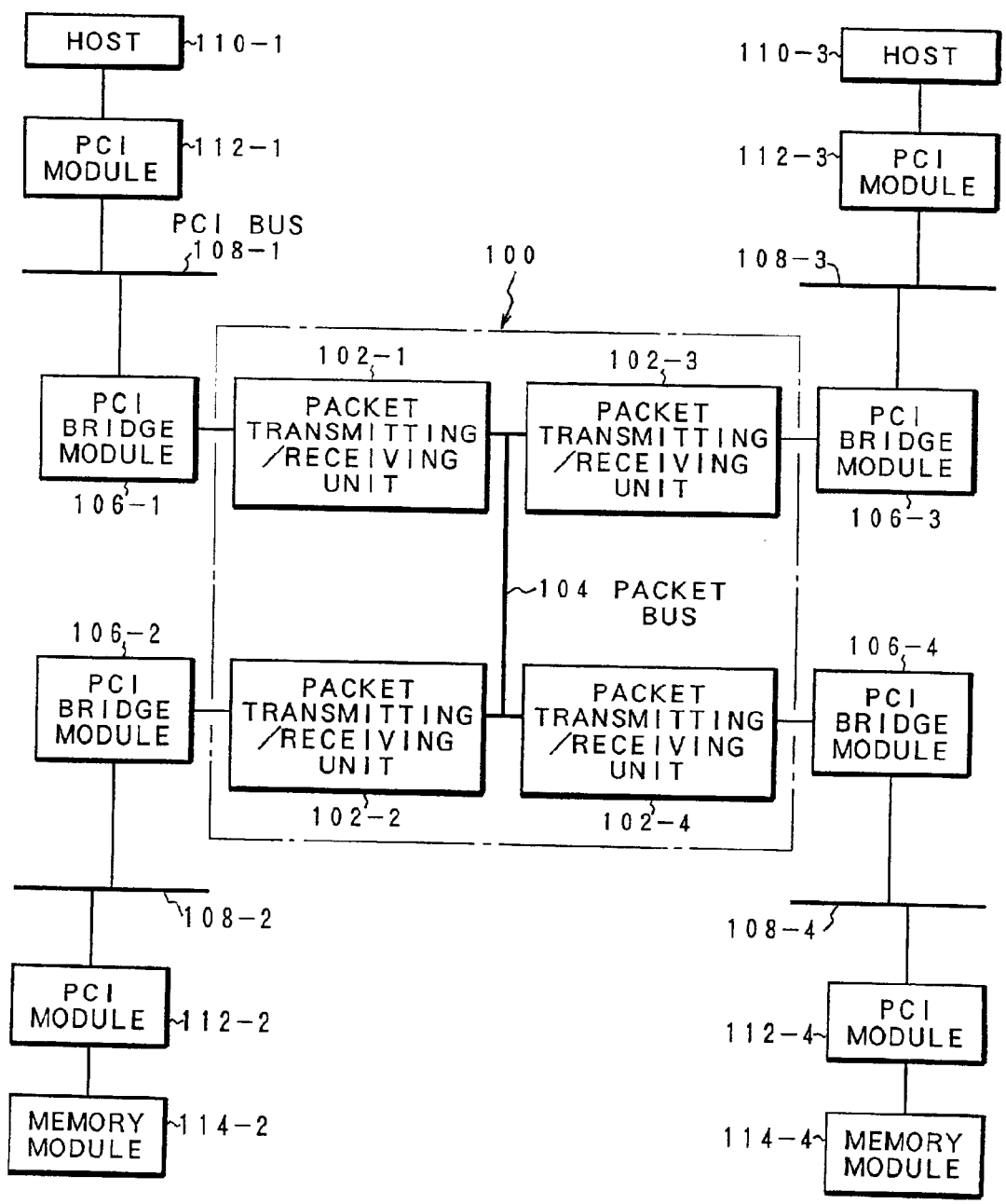
FIG. 1 is an explanatory diagram of a schematic construction of a computer system for performing a packet transmitting/receiving process.

FIG. 2 is a constructional diagram of a computer system to which packet transmitting/receiving method and apparatus of the invention are applied. The computer system to which the packet transmitting/receiving method of the invention is applied has hosts 10-1 and 10-2. The hosts are connected to PCI buses 12-1 and 12-3, respectively. A device 14-1 functioning as an input/output subsystem is connected to the PCI bus 12-1 to which the host 10-1 is connected. Similarly, a device 14-2 is also connected to the PCI bus 12-3 to which the host 10-2 is connected. A memory module functioning as a main storage of the hosts 10-1 and 10-2 is stored in each of casings 16-1, 16-2, . . . , and 16-*n* together with a packet transmitting/receiving module according to the invention. Each of the casings 16-1 to 16-*n* is connected to the PCI buses 12-1 and 12-3. The casings 16-1 to 16-*n* are connected by packet buses 18, thereby enabling a packet transfer to be performed between the casings 16-1 to 16-*n* via the packet bus 18.

FIG. 3 shows an internal construction of the casing 16-1 in FIG. 2 together with external host and device side. In FIG. 2, the PCI buses 12-1 and 12-3 are shown as external buses of the casings 16-1 to 16-*n*. However, in the actual apparatus, as shown in FIG. 3, the PCI buses 12-1 and 12-3 are located in the casing 16-1. On the other hand, the hosts 10-1 and 10-2 and the devices 14-1 and 14-2 provided outside are connected via the PCI modules.

In FIG. 3, processing modules 20-1 and 20-2 for issuing a write command and a read command in response to a write command and a read command from the hosts 10-1 and 10-2 are provided in the casing 16-1. The processing modules 20-1 and 20-2 are connected to the PCI buses 12-1 and 12-3, respectively. The external devices 14-1 and 14-2 are connected to the PCI buses 12-1 and 12-3 through device modules 22-1 and 22-2. Memory modules 32-1 and 32-2 are connected into the casing 16-1 through other PCI buses 12-2 and 12-4 and have main storage units 34-1 and 34-2. The PCI buses 12-1 to 12-4 to which the processing modules 20-1 and 20-2, device modules 22-1 and 22-2, and memory modules 32-1 and 32-2 are connected as mentioned above are connected through a packet transmitting/receiving module 26 according to the invention. PCI bridge modules 24-1, 24-2, 24-3, and 24-4 are provided between the packet transmitting/receiving module 26 and the PCI buses 12-1 to 12-4, respectively. The PCI bridge modules 24-1 to 24-4 performs the conversion of the packet between the commands of the PCI buses 12-1 to 12-4 and the packet transmitting/receiving module 26.

FIG. 4 is a block diagram of an internal construction of the packet transmitting/receiving module 26 according to the invention in FIG. 3 and it is shown together with the PCI bridge modules as external modules provided on the PCI bus side. Packet transmitting/receiving units 28-1, 28-2, 28-3, and 28-4 are provided in the packet transmitting/receiving module 26 in correspondence to the PCI bridge modules 24-1 to 24-4 of the PCI buses 12-1 to 12-4. The packet transmitting/receiving units 28-1, 28-2, 28-3, and 28-4 are connected by the packet buses 18. The packet bus 18 is a bus of, for example, a width of 64 bits and operates, for example, at 66 MHz. The packet buses 18 are led to the outside of the packet transmitting/receiving module 26 and connected to a packet transmitting/receiving module provided for another casing as shown in FIG. 2. Node IDs 36-1, 36-2, 36-3, and 36-4 serving as addresses for the packet transmission/reception are preset in the packet transmitting/receiving units 28-1 to 28-4, respectively. The node IDs 36-1 to 36-4 are expressed by node IDs "#A", "#B", "#C", and "#D" for simplicity of explanation.

FIG. 5 is a time chart for packet transmitting/receiving processes of the packet transmitting/receiving units 28-1 to 28-3 in the case where the packet transmitting/receiving unit 28-4 provided for the packet transmitting/receiving module 26 in FIG. 4 is set to a transmission destination. According to a transmitting sequence by the packet transmitting/receiving units 28-1 to 28-3, first, the packet transmitting/receiving unit on the transmitting source side designates the node ID of the transmission destination for the packet bus 18 and asserts a transmitting request signal REQ, specifically speaking, a bus use request signal. In response to the transmitting request signal REQ asserted on the transmitting source side, the packet transmitting/receiving unit on the transmission destination side transmits a response signal from the transmitter if the unit is in the packet receivable state, specifically speaking, a grant signal serving as a bus use permission signal as an acknowledgment response ACK. Therefore, the packet transmitting/receiving unit on the transmitting source side starts the data transfer of the packet only when the acknowledgment response ACK on the transmission destination side responsive to the transmitting request signal REQ is received. First, the packet transmitting/receiving unit 28-2 of the node ID "#B" asserts a transmitting request "REQ#B" for the packet transmitting/receiving unit 28-4. In response to the assertion of the transmitting request "REQ#B", if an acknowledgment response "ACK#B" is received from the packet transmitting/receiving unit 28-4 at time t1, the packet transmitting/receiving unit 28-2 transfers packet data D0, D1, and D2 from time t2 as shown in packet data "DT#B". At time t2, the packet transmitting/receiving unit 28-1 of the node ID "#A" similarly designates the packet transmitting/receiving unit 28-4 and asserts a transmitting request "REQ#A". At this time, since the packet transmitting/receiving unit 28-4 on the transmission destination side receives the packet data D0 to D2 transferred from the packet transmitting/receiving unit 28-2 at time t2, the unit 28-4 does not generate an acknowledgment response "ACK#A" to the packet transmitting/receiving unit 28-1. When the transfer of the packet data D2 is finished at time t3, the packet transmitting/receiving unit 28-4 sends the acknowledgment response "ACK#A" to the packet transmitting/receiving unit 28-1. Therefore, packet data D3, D4, and D5 are transferred from the packet transmitting/receiving unit 28-1 to the packet transmitting/receiving unit 28-4 from time t3.

As mentioned above, in the packet transmitting/receiving units 28-1 to 28-4 of the invention, the packet data is transferred for the first time when the transmitting request REQ is issued to the transmission destination and the acknowledgment response ACK is obtained.

The unreceivable state where the acknowledgment response "ACK#A" is not transmitted from the packet transmitting/receiving unit 28-4 in the case where, for example, the transmitting request "REQ#A" is asserted from the packet transmitting/receiving unit 28-1 to the packet transmitting/receiving unit 28-4 occurs in not only the case where the packet data from another packet transmitting/receiving unit is being received as shown at a time interval between t2 and t3 but also a case where the transfer of the reception packet to the PCI bridge module 24-4 from the buffer provided for the packet transmitting/receiving unit 28-4 on the transmission destination side is not finished and the buffer is full or a case where a response of the transmission permission for the transmitting request is in the inhibiting state based on the error detection due to the hardware failure of the PCI bridge module 24-4. As mentioned above, when the PCI bridge module 24-4 on the transmission destination side is in the unreceivable state, since the packet transmitting/receiving unit 28-1 which issued the transmitting request cannot obtain a response of the transmission permission, the unit 28-1 is in the transfer waiting state with the packet stored in the buffer for a time interval between t2 and t3. In the transfer waiting state, even if a new transmission packet is received to the packet transmitting/receiving unit 28-1 from the external PCI bridge module 24-1, the unit 28-1 is set into the transfer waiting state by storing such a reception packet into the buffer. When the buffer provided for the packet transmitting/receiving unit 28-1 is full, the reception of a new packet from the PCI bridge module 24-1 is inhibited. In addition to the sequence of the fundamental packet transmission/reception in the packet transmitting/receiving units 28-1 to 28-4 as mentioned above, according to the invention, there is newly provided a function for forcedly withdrawing the transfer waiting state and transferring the packet of the high priority in the case where the packet of the high priority is received from the external PCI bridge module in the state where a response of the transmission permission for the transmitting request is not obtained and the unit is in the transfer waiting state. Since the packet of the high priority is preferentially transferred by withdrawing the transfer waiting state, in the invention, the priority is provided in accordance with the kind of packet which is transferred in the packet transmitting/receiving module 26. The packets which are transferred by the packet transmitting/receiving module 26 of the invention can be mainly classified into: the command system packet of the read command, write command, etc.; the answer system packet for the command system (response system packet); and, further, the internal register access packet which is used for error information collection or the like. In the invention, therefore, the priorities are preset to those three kinds of packets. First, between the command system packet and the answer system packet, the higher priority than that of the command system packet is set to the answer system packet of high emergency. As compared with the command system packet and the answer system packet, the highest priority is set to the internal register access packet. That is, assuming that the priorities are set to the first place, second place, and third place, they are set as follows.

The first place of the priority:
    internal register access packet
The second place of the priority:
    answer system packet
The third place of the priority:
    command system packet First, a preferential process of the answer system packet will be briefly explained as follows. Assuming that as shown in a time interval between t2 and t3 of the time chart of FIG. 5, when the packet transmitting/receiving unit 28-1 is in the transfer waiting state, the answer system packet of the command system packet received from the packet transmitting/receiving unit 28-2 before such a time interval is received from the PCI bridge module 24-1, the transfer waiting state is withdrawn and the answer system packet is transmitted to the packet transmitting/receiving unit 28-2. Specifically speaking, the packet transmitting/receiving unit 28-1 which withdrew the transfer waiting state issues the transferring request to the packet transmitting/receiving unit 28-2. At this time, since the packet transmitting/receiving unit 28-2 is in the receivable state, it returns a response of the transmission permission and the answer system packet is transferred on the basis of it. When the transfer of the answer system packet is finished, the packet transmitting/receiving unit 28-1 is again returned to the transfer waiting state because the transmittable state of the packet transmitting/receiving unit 28-4 is not cancelled.

The preferential process of the internal register access packet will now be briefly explained. The internal register access packet is transferred in the case where, for example, an error in the PCI bridge module provided outside of the packet receiving unit on the transfer destination side is detected due to a hardware failure or the like and the unit enters the unreceivable state due to the error detection and, in a state where a response of the transmission permission for the transmitting request is not obtained, the internal register access system command, for example, an error read packet for collecting the error information is transmitted. For example, if the PCI bridge module 24-4 provided outside of the packet transmitting/receiving unit 28-4 in FIG. 4 causes a hardware failure and this error detection is performed by the packet transmitting/receiving unit 28-4, a response of the transmission permission for the transmitting request from the packet transmitting/receiving unit 28-1 is not issued and the packet transmitting/receiving unit 28-1 enters the transfer waiting state. Since the unreceivable state of the packet transmitting/receiving unit 28-4 depends on the hardware failure of the PCI bridge module 24-4, the transfer waiting state of the packet transmitting/receiving unit 28-1 is not cancelled. Therefore, a transfer abnormality is recognized on the side of the processing module connected to the PCI bridge module 24-1 through the PCI bus 12-1. An error log of the transfer destination is requested to the PCI bridge module 24-1, so that the PCI bridge module 24-1 generates an error read packet as an internal register access packet. When the error read packet is received by the packet transmitting/receiving unit 28-1 in the transfer waiting state, it is determined that the packet is the internal register access packet having the highest priority as compared with the priorities of the other command system packet and answer system packet. The packet transmitting/receiving unit 28-1 withdraws the transfer waiting state and issues the transmitting request of the error read packet to the packet transmitting/receiving unit 28-4. At this time, although the packet transmitting/receiving unit 28-4 is in the inhibiting state of a response of the transmission permission based on the error detection due to the hardware failure of the PCI bridge module 24-4, if it is determined that the transmitting request of the internal register access packet has been issued from the packet transmitting/receiving unit 28-1, the unit 28-4 returns a response of the transmission permission to the packet transmitting/receiving unit 28-1. Therefore, the error read packet is transferred from the packet transmitting/receiving unit 28-1 to the packet transmitting/receiving unit 28-4. The PCI bridge module 24-4 can form error detail information and return the answer system packet from the packet transmitting/receiving unit 28-4 to the packet transmitting/receiving unit 28-1. The error detail information received by the PCI bridge module 24-1 is described in an upper processing module, thereby recognizing the hardware failure of the PCI bridge module 24-4. It is possible to perform a countermeasure process for inhibiting the subsequent access to the module on the PCI bus 12-4 side.

FIGS. 6A and 6B are block diagrams showing the details of a packet transmitting function unit and a packet receiving function unit built in each of the packet transmitting/receiving units 28-1 to 28-4 provided for the packet transmitting/receiving module 26 in FIG. 4. The packet transmitting/receiving units 28 are mainly classified into a packet transmitting function unit 48 and a packet receiving function unit 50. The packet transmitting function unit 48 receives the packet from the external PCI bridge module and transmits the packet to another packet transmitting/receiving unit through the packet bus. On the other hand, the packet receiving function unit 50 receives the packet from another packet transmitting/receiving unit through the packet bus and outputs it to an external PCI bridge module. The packet transmitting function unit 48 is constructed by: a packet receiving unit 52; a transmission packet priority discriminating unit 54; a register access system packet buffer 56; a command system packet buffer 58; an answer system packet buffer 60; a register access system transmitting request forming unit 62; a command system transmitting request forming unit 64; an answer system transmitting request forming unit 66; a packet transmitting request arbiter 68; and a packet transmitting unit 70. The transmission packet priority discriminating unit 54 has a function for discriminating the priority corresponding to the kind of packet received from the PCI bridge module and discriminates whether the reception packet is the register system packet having the highest priority, the answer system packet having the second highest priority, or further, the command system packet having the lowest priority. The reception packet is stored in the packet buffers 56, 58, and 60 provided in correspondence to those packet kinds, respectively. A solid line indicates a flow of data and a broken line shows a flow of a control signal. When the packet corresponding to the packet kind is stored in each of the packet buffers 56, 58, and 60, the system of the packet kind corresponding to each of the next transmitting request forming units 62, 64, and 66 operates and issues the transmitting request to the packet transmitting request arbiter 68. If the packet transmitting request arbiter 68 is not in the transfer waiting state, the arbiter 68 designates the node ID of the transmission destination and asserts the packet transmitting request signal REQ. In response to the assertion of the transmitting request REQ, when the acknowledgment response ACK is received from the packet transmitting/receiving unit on the transmission destination side, the packet data is read out from the corresponding packet buffer by the packet transmitting unit 70 and transferred to the packet bus. When the transmitting request is obtained in the transfer waiting state, the packet transmitting request arbiter 68 performs the different operation in response to the packet kind by which the transmitting request has been issued. First, in the case where a response of the transmission permission for the command system transmitting request is not obtained and the packet transmitting request arbiter 68 is in the transfer waiting state, when an answer system transmitting request whose priority is higher than that of the command system transmitting request is received from the answer system transmitting request forming unit 66, the arbiter 68 withdraws the transfer waiting state and asserts the transmitting request REQ to the transmission destination. Also in the case where the transmitting request is received from the register access system transmitting request forming unit 62 having the highest priority, the packet transmitting request arbiter 68 withdraws the transfer waiting state and asserts the transmitting request REQ to the transmission destination. In the case where the acknowledgment response for the transmitting request of the answer system packet is not obtained and the packet transmitting request arbiter 68 is in the transfer waiting state, even if the command system transmitting request whose priority is lower than that of such a request is received, the transfer waiting state is not withdrawn. On the other hand, if the transmitting request of the register access system packet whose priority is higher than that of the answer system packet is issued, the arbiter 68 withdraws the transfer waiting state and asserts the transmitting request of the register access system packet. That is, when the arbiter 68 is in the transfer waiting state by the packet transmitting request of a certain priority, if there is a packet transfer request of a priority higher than it, the packet transmitting request arbiter 68 withdraws the transfer waiting state and issues the transmitting request of the packet of the high priority. Owing to the process by the withdrawal of the transfer waiting state according to the priority of the packet of the packet transmitting request arbiter 68, for example, if there is the transmitting request of the answer system packet in the state where the arbiter 68 enters the transfer waiting state due to the transmitting request of the command system packet, the answer system packet can be preferentially processed.

The packet receiving function unit 50 will now be described. The packet receiving function unit 50 is constructed by: a packet receiving unit 72; a packet receiving request arbiter 74; a reception packet priority discriminating unit 76; packet buffers 78, 80, and 82 of the register access system, command system, and answer system; packet transmission control units 84, 86, and 88 of the register access system, command system, and answer system; a packet transmission control arbiter 90; and a packet transmission error detecting unit 92. If the packet receiving request arbiter 74 is in a receivable state in response to the transmitting request REQ from another transmitting/receiving unit via the packet bus 18, the arbiter 74 returns the acknowledgment response ACK. When the transmitting request REQ is received from the other transmitting/receiving unit, if one of the packet buffers 78, 80, and 82 corresponding to the kind of packet to which the transmitting request was issued is full, the transmitting source is set into the transfer waiting state without returning the acknowledgment response ACK. Also in the case where an error detection signal is obtained from the packet transmission error detecting unit 92, the packet receiving request arbiter 74 is in the inhibiting state of a response of the transmission permission. Even if there is the transmitting request REQ, the acknowledgment response ACK is not returned in principle. The packet transmission error detecting unit 92 causes an error detection output in the case where, for example, a hardware failure occurs in the external PCI bridge module provided for the packet transfer destination from the packet transmission control arbiter 90. In the inhibiting state of a response of the transmission permission based on the error detection due to the hardware failure or the like of the external PCI bridge module, in the case where the packet receiving request arbiter 74 provided for the packet receiving function unit 50 of the invention determines the reception of the transmitting request REQ of the register access system packet having the highest priority from the other packet transmitting/receiving unit through the packet bus 18, even if the arbiter 74 is in the inhibiting state of a response of the transmission permission based on the error detection, the arbiter 74 returns the transmission acknowledgment response ACK to the requesting source. The discrimination in the packet receiving request arbiter 74 about whether the transmitting request REQ is the transmitting request based on the register access system packet or not is made by checking the following sequence of the transmitting request.

(1) The transmitting request REQ is received.
(2) The received transmitting request REQ is withdrawn.
(3) The transmitting request REQ is received again.

When the sequence of the transmitting request REQ in steps (1) to (3) is satisfied, the packet receiving request arbiter 74 determines that the request is the transmitting request of the register access system packet, and returns the transmission acknowledgment response ACK. Therefore, even if the packet receiving request arbiter 74 is in the inhibiting state of a response of the transmission permission in the error detecting state due to the hardware failure of the external PCI module, if it is determined that the request is the transmitting request of the register access system packet, a response of the transmission permission is returned, thereby enabling the register access system packet for collecting the error information to be transmitted and received. The sequence of (1) to (3) of the transmitting request in the packet receiving request arbiter 74 corresponds to the sequence of the transmitting source such that the process for collecting the error information first issues the transmitting request of the command system packet and subsequently withdraws the transfer request of the command system packet because no reply is obtained, and a transfer request is again issued for transmitting the register access system packet for obtaining the error log.

Figure 7B:
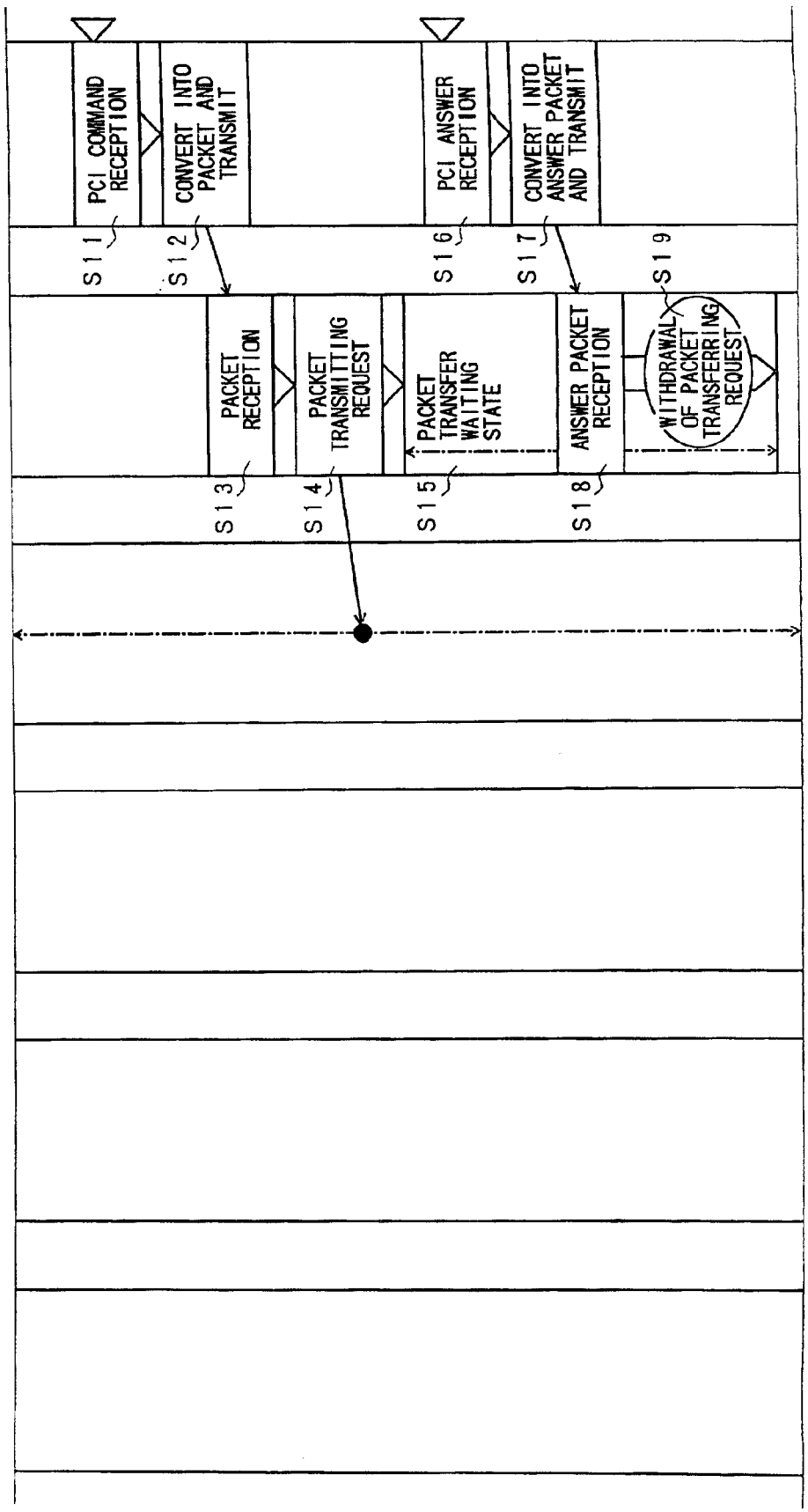
Figure 7C:
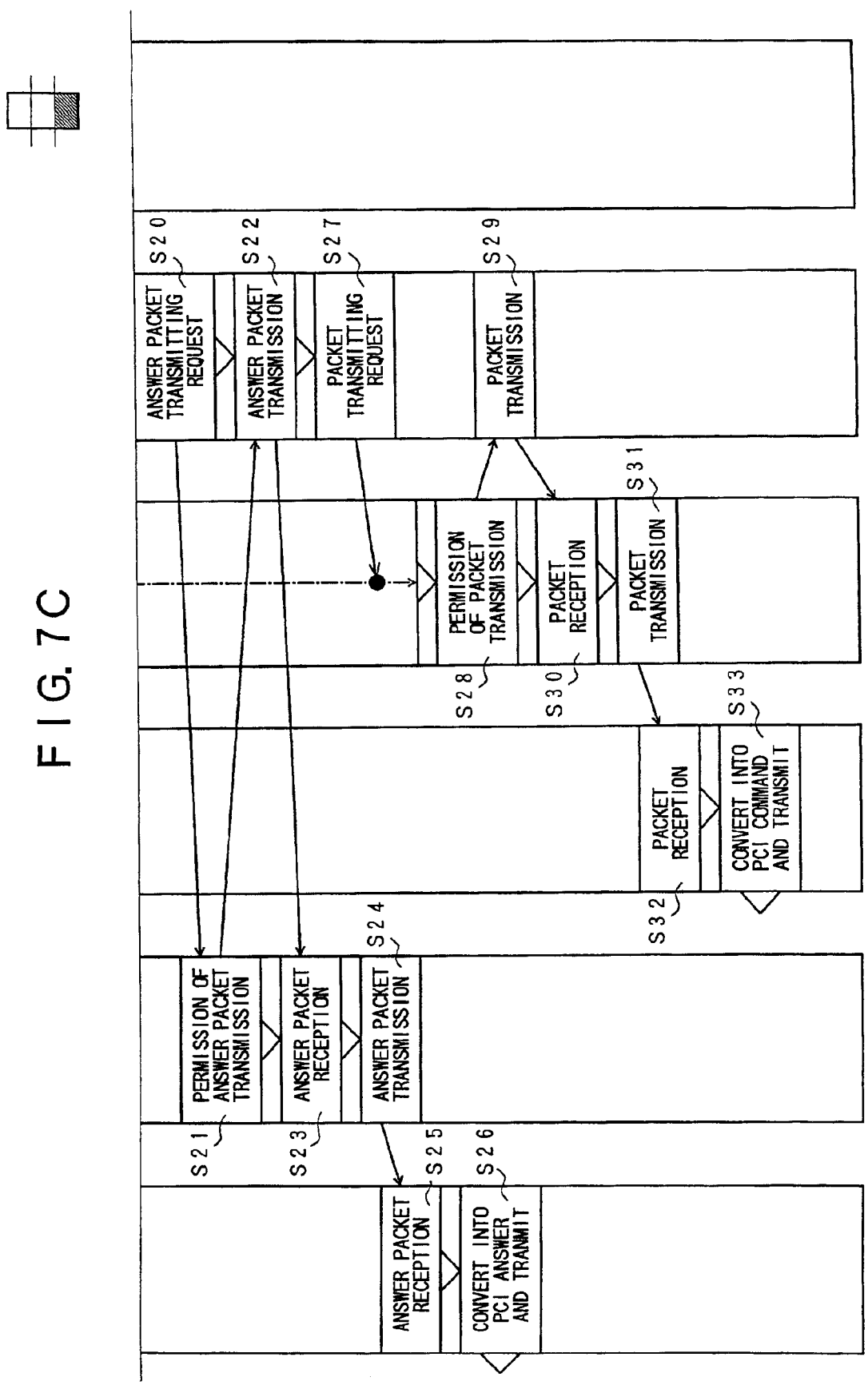

FIGS. 7A, 7B, and 7C show a processing procedure for a preferential process of the answer system packet in the packet transmitting/receiving module 26 in FIG. 4. In FIGS. 7A, 7B, and 7C, when the PCI bridge module 24-1 first receives the PCI command from the PCI bus 12-1 in step S1, the PCI command is converted into the packet in step S2 and transmitted to the packet transmitting/receiving unit 28-1. The packet transmitting/receiving unit 28-1 receives the packet from the PCI bridge module 24-1 in step S3 and asserts the packet transmitting request by the designation of the node ID of the packet transmitting/receiving unit 28-4 serving as a transmission destination in step S4. At this time, the packet transmitting/receiving unit 28-4 is in the receivable state and returns the packet transmission permission to the packet transmitting/receiving unit 28-1 in step S5.

Therefore, the packet transmitting/receiving unit 28-1 transmits the packet to the packet transmitting/receiving unit 28-4 in step S6. The packet is received in step S7. When the packet reception is finished, the packet transmitting/receiving unit 28-4 transmits the reception packet to the PCI bridge module 24-4 in step S8. The packet is received in step S9. In step S10, the PCI bridge module 24-4 converts the packet into the PCI command and transmits it to the module on the address destination side via the PCI bus. Subsequently, when the PCI bridge module 24-4 receives the PCI command in which the packet transmitting/receiving unit 28-2 is set to the transmission destination in step S11 by the self PCI bridge, the module 24-4 converts it into the packet and transmits it into the packet transmitting/receiving unit 28-4 in step S12. The packet transmitting/receiving unit 28-4 receives the packet in step S13 and issues the packet transmitting request to the packet transmitting/receiving unit 28-2 of the designated node ID in step S14. However, the packet transmitting/receiving unit 28-2 on the transmission destination side is in a busy state at this time. The packet transmission permission is not issued in response to the packet transmitting request generated in step S14. Thus, the packet transmitting/receiving unit 28-4 enters the packet transfer waiting state as shown in step S15. Subsequently, as shown in step S16 in FIGS. 7A to 7C, when the PCI bridge module 24-4 receives the PCI answer command corresponding to the PCI command converted and transmitted in step S10 in FIGS. 7A to 7C, it is converted into the answer system packet and transmitted to the packet transmitting/receiving unit 28-4 in step S17. The answer system packet is received in step S18. At this time, the packet transmitting/receiving unit 28-4 is in the packet transfer waiting state as shown in step S15 because of the busy state for the transmitting request to the packet transmitting/receiving unit 28-2 issued in step S14 in FIGS. 7A to 7C. However, when it is determined that the packet received in step S18 is the answer system packet, the packet transfer request is withdrawn in step S19. A transmitting request of the answer system packet is issued to the packet transmitting/receiving unit 28-1 on the transmission destination side in step S20. The packet transmitting/receiving unit 28-1 issues the transmission permission of the answer system packet in step S21, so that the packet transmitting/receiving unit 28-2 transmits the answer system packet to the packet transmitting/receiving unit 28-1 in step S22. The answer system packet is received in step S23. The answer system packet is transmitted to the PCI bridge module 24-1 in step S24. The PCI bridge module 24-1 receives the answer system packet in step S25. The answer system packet is converted into the PCI answer command and transferred to the module on the transmitting source side via the external PCI bus in step S26. As mentioned above, even when the packet transmitting/receiving unit 28-4 is in the packet transfer waiting state in step S15, if the answer system packet is received from the PCI bridge module 24-4 in this state, the packet transfer request can be withdrawn and the answer system packet can be preferentially transferred. In the packet transmitting/receiving unit 28-4, since the packet to the packet transmitting/receiving unit 28-2 is in the packet transfer waiting state, the packet transmitting request is issued in step S27. However, also at this time, the packet transmitting/receiving unit 28-2 is in the busy state. After that, the busy state of the packet transmitting/receiving unit 28-2 is cancelled. In step S28, the unit 28-2 returns the packet transmission permission to the packet transmitting/receiving unit 28-4. The packet is transmitted in step S29, received in step S30, and outputted to the PCI bridge module 24-2 in step S31. After the packet is received in step S32, it is converted into the PCI command in step S33 and transmitted to the corresponding module through the PCI bus.

Figure 8B:
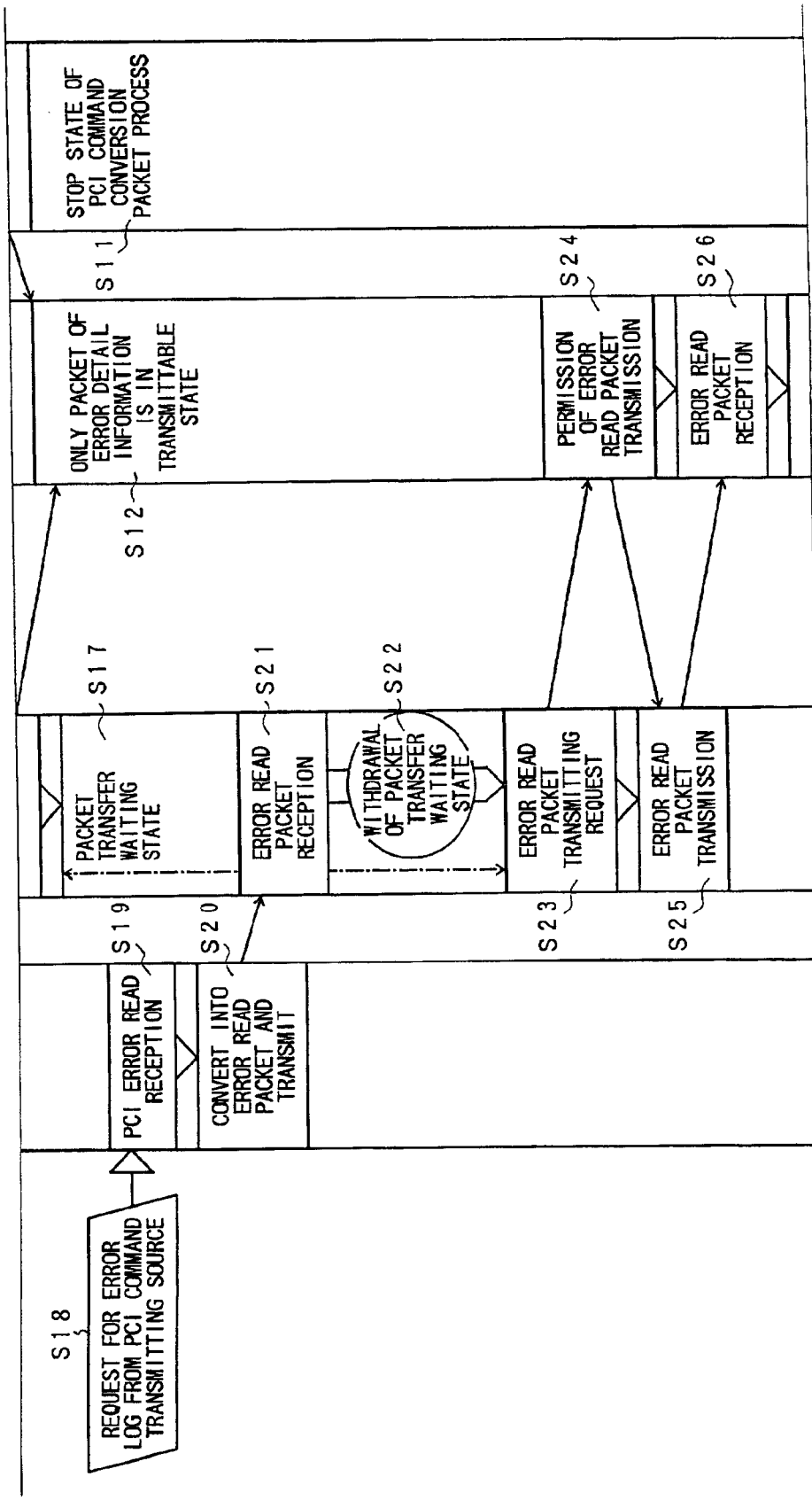
Figure 8C:
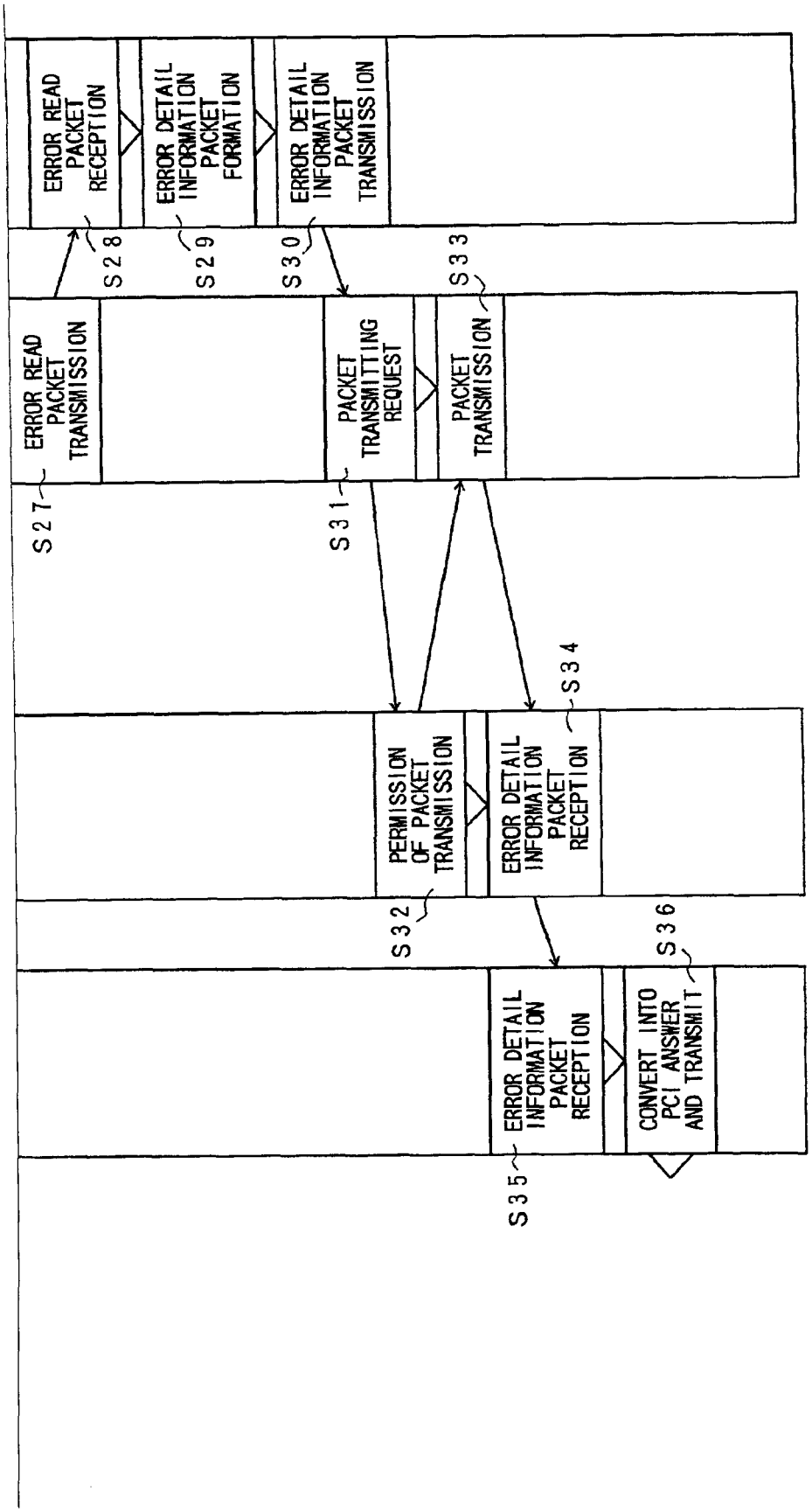

FIGS. 8A, 8B, and 8C are time charts in the case where in the packet transmitting/receiving module 26 in FIG. 4, with respect to the preferential process of the internal register access detection packet for the error log in the error detection based on the hardware failure of the external PCI bridge module, the transmission and reception between the packet transmitting/receiving units 28-1 and 28-4 are performed as an example. First, in step S1 in FIGS. 8A to 8C, the PCI bridge module 24-1 receives the PCI command. In step S2, it is converted into the packet and transmitted to the packet transmitting/receiving unit 28-1. The packet transmitting/receiving unit 28-1 receives the packet in step S3 and asserts the transmitting request to the packet transmitting/receiving unit 28-4 on the transmission destination side in step S4. In this instance, since the packet transmitting/receiving unit 28-4 is in the receivable state, it returns the packet transmission permission in step S5. The packet is transmitted by the packet transmitting/receiving unit 28-1 in step S6 and received in step S7. The packet is transmitted to the PCI bridge module 24-4 in step S8 and received in step S9. At this time, the PCI bridge module 24-4 causes the hardware failure. In step S10, the packet transmission error detection is notified to the packet transmitting/receiving unit 28-4. Therefore, the packet transmitting/receiving unit 28-4 enters the operating state of enabling only the packet of the error detail information to be transmitted in step S12. The PCI bridge module 24-4 in which the error occurred enters a state where the packet process for converting the reception packet into the PCI command is stopped as shown in step S11. In the PCI bridge module 24-1 on the packet transmitting/receiving unit 28-1 side, a new PCI command is received in step S13, converted into a packet and transmitted to the packet transmitting/receiving unit 28-1 in step S14, and received in step S15. In step S16, the packet transmitting/receiving unit 28-1 asserts the transmitting request to the packet transmitting/receiving unit 28-4. At this time, as shown in step S12, the packet transmitting/receiving unit 28-4 has been switched to the operating state of making a response of the transmission permission only for the internal register access detecting command on the basis of the error detection of the PCI bridge module 24-4. Therefore, since the unit 28-4 does not return the transmission permission in response to the assertion of the command system packet transmitting request in step S16, the packet transmitting/receiving unit 28-1 enters the packet transfer waiting state in step S17. In FIGS. 8A to 8C, the PCI bridge module 24-1 subsequently receives the request of the error log from the transmitting source of the PCI command on the PCI bus side in step S18 and receives a PCI error read command in step S19. A PCI error read command S20 is converted into an error read packet serving as an internal register access packet and transmitted to the packet transmitting/receiving unit 28-1. When the packet transmitting/receiving unit 28-1 receives the error read packet from the PCI bridge module 24-1 in step S21, it is determined that the error read packet is the internal register access packet. The unit 28-1 withdraws the packet transfer waiting state in step S22 and asserts the transmitting request of the error read packet for the packet transmitting/receiving unit 28-4 in step S23. In step S24, the packet transmitting/receiving unit 28-4 determines that the transmitting request is the transmitting request of the error read packet, and returns the transmission permission. As for the discrimination about the transmitting request of the error read packet in step S24, it is determined that the transmitting request is the transmitting request of the error read packet, namely, the transmitting request of the internal register access packet when the following three sequence procedures such that: the first transmitting request is issued in step S16 in FIGS. 8A to 8C; subsequently, the transfer request is also withdrawn by the withdrawal of the packet transfer waiting state in step S22 in FIGS. 8A to 8C; and the transfer request is again issued in step S23. In step S24, the transmission permission is returned only for the error read packet for requesting the error detail information as shown in step S12 in FIGS. 7A to 7C. The packet transmitting/receiving unit 28-1 which received the transmission permission transmits the error read packet in step S25. The error read packet is received in step S26. The error read packet is transmitted to the PCI bridge module 24-4 in step S27. When the error read packet is received in step S28, the PCI bridge module 24-4 forms the packet of the error detail information in step S29 and transmits the packet of the error detail information to the packet transmitting/receiving unit 28-4 in step S30. The packet transmitting request is issued to the packet transmitting/receiving unit 28-1 in step S31. When the packet transmission permission is asserted in step S23, the packet of the error detail information is transmitted in step S33. The packet transmitting/receiving unit 28-1 receives it in step S34 and transmits it to the PCI bridge module 24-1. It is received in step S35. Further, in step S36, the packet is converted into the PCI answer command and transmitted to the module on the transmitting source side through the PCI bus. Thus, the error state of the PCI bridge module 24-4 on the transmission destination side is recognized by the transmitting source of the external PCI command. When the error state of the PCI bridge module 24-4 is recognized, since the access using the system of the PCI bridge module 24-4 cannot be performed, this system is excluded from the access targets and the access to the necessary modules by the other system is performed. A situation such that the system is hung up by the hardware failure of the PCI bridge module 24-4 can be avoided.

According to the invention as mentioned above, in the case where the command system packet is transmitted, the unit enters the transfer waiting state because the transmission permission is not obtained, and, for example, the answer system packet of the high priority is received from the external module in the transfer waiting state, the transfer waiting state is forcedly withdrawn and the transfer of the answer system packet of the high priority can be requested. The answer system packet of high emergency is preferentially transferred without being obstructed by the transfer waiting state, so that the deterioration in processing performance of the packet transfer can be prevented.

When the external module such as a PCI bridge module or the like determines the receiving request of the internal register access packet having the highest priority for obtaining the error log, for example, the error read packet in the response inhibiting state of the transmission permission caused due to the error detection, a response of the transmission permission is made only to the transmitting request of the error read packet, the error read packet is received, and the error information of the external module can be certainly returned to the transmitting source. The packet transmission/reception does not function due to the transfer waiting state by the hardware failure occurring in the packet transmitting/receiving system, and the hand-up can be certainly prevented.

Although the kinds of packets are classified into the internal register access packet, answer system packet, and command system packet in order of the high priorities in the embodiment, the invention is not limited to the priorities of the packet kinds but the priority can be allocated to the packet command of high emergency as necessary.

Even in case of the same command system packet, with respect to the command of the process of high emergency, by allowing the priority to be included in a command code, even if the unit is in the transfer waiting state due to the transmitting request of the command system packet of the low priority, the transfer waiting state can be withdrawn and the command system packet of the high priority can be preferentially transmitted.

The invention incorporates various modifications and variations without losing the objects and advantages of the invention. Further, the invention is not limited by the numerical values shown in the embodiment.

What is claimed is:

1. A packet transmitting/receiving method for a computer system in which a plurality of packet transmitting/receiving units provided in correspondence to external modules are connected via a packet bus, in which each of said packet transmitting/receiving units is constructed in such a manner that when a packet received from said external module is transmitted, in the case where a transmitting request is issued and a transmission permission is obtained from a destination of a transmission, said packet is transmitted, and in the case where the transmission permission is not obtained, said packet is stored in a buffer and said unit is set into a transfer waiting state, and when the transmitting request of the packet is received from another packet transmitting/receiving unit, if said unit is in a packet receivable state, a response of the transmission permission is made and the packet is received, and if said unit is in a packet unreceivable state, the response of the transmission permission is inhibited, wherein with respect to the packet which is transmitted/received by said packet transmitting/receiving unit, whether a kind of packet is an internal register access packet, a response system packet, or a command system packet is discriminated, if said packet kind is determined to be said internal register access packet, said packet is stored into a first packet buffer in which a first priority has been set, if said packet kind is determined to be said response system packet, said packet is stored into a second packet buffer in which a second priority has been set, and further, if said packet kind is determined to be said command system packet, said packet is stored into a third packet buffer in which a third priority has been set, in the transfer waiting state where the command system packet to a certain transmission destination has been stored in said third packet buffer, in the case where the internal register access packet to the same transmission destination is received from said external module and stored in said first packet buffer, said packet transmitting/receiving unit removes the transfer waiting state of the command system packet of the low priority stored in said third packet buffer and transmits the response system packet of the high priority stored in said second packet buffer, and in a response inhibiting state of the transmission permission caused by an error of the external module, in the case where the transmitting request of the internal register access packet of the highest priority is received, said packet transmitting/receiving unit on the transmission destination side makes a response of the transmission permission, receives the internal register access packet, and returns an error detail information packet showing an error state of the external module.

2. A method according to claim 1, wherein in the response inhibiting state of the transmission permission caused by the error of the external module, after the packet transmitting request is received, in the case where said packet transmitting request is withdrawn and the withdrawn packet transmitting request is subsequently again issued, said packet transmitting/receiving unit at said destination determines that said request is the transmitting request of said internal register access packet of the highest priority and makes a response of the transmission permission.

3. A packet transmitting/receiving method for a computer system in which a plurality of packet transmitting/receiving units provided in correspondence to external modules are connected via a packet bus, in which each of said packet transmitting/receiving units is constructed in such a manner that when a packet received from said external module is transmitted, in the case where a transmitting request is issued and a transmission permission is obtained from a destination, said packet is transmitted, and in the case where the transmission permission is not obtained, said packet is stored in a buffer and said unit is set into a transfer waiting state, and when the transmitting request of the packet is received from another packet transmitting/receiving unit, if said unit is in a packet receivable state, a response of the transmission permission is made and the packet is received, and if said unit is in a packet unreceivable state, the response of the transmission permission is inhibited, wherein kinds of packets which are transmitted/received by said packet transmitting/receiving unit are discriminated and the packet is stored into the corresponding packet buffer among a plurality of packet buffers in which priorities have been set in accordance with kinds of packets, in the transfer waiting state of the packet stored in the packet buffer of the low priority to a certain transmission destination, in the case where the packet to another transmission destination is received from the external module and stored in the packet buffer of the high priority, said packet transmitting/receiving unit withdraws the transfer waiting state of the packet stored in said packet buffer of the low priority and transmits the packet stored in said packet buffer of the high priority, and in a response inhibiting state of the transmission permission caused by an error of the external module, in the case where the transmitting request of the packet of the highest priority is received said packet transmitting/receiving unit on the destination makes a response of the transmission permission, receives the internal register access packet, and returns an error detail information packet showing an error state of the external module.

4. A method according to claim 3, wherein in the response inhibiting state of the transmission permission caused by the error of the external module, after the packet transmitting request is received, in the case where said packet transmitting request is withdrawn and the withdrawn packet transmitting request is subsequently again issued, said packet transmitting/receiving unit at said destination determines that the request is the transmitting request of the packet of the highest priority and makes a response of the transmission permission.

5. A packet transmitting/receiving apparatus for a computer system, wherein a plurality of packet transmitting/receiving units provided in correspondence to external modules are connected via a packet bus, and each of said packet transmitting/receiving units comprises:

a packet transmitting function unit for, when a packet received from said external module is transmitted, in the case where a transmitting request is issued and a transmission permission is obtained from a transmission destination, transmitting said packet, and in the case where the transmission permission is not obtained, for storing said transmission packet into a buffer and setting said unit into a transfer waiting state, and a packet receiving function unit for, when a transmitting request is received from another packet transmitting/receiving unit, making a response of the transmission permission in the case where said unit is in a packet receivable state, receiving the packet, and stopping the response of the transmission permission in the case where said unit is in a packet unreceivable state, and further said packet transmitting function unit comprises:

a transmission packet priority discriminating unit for discriminating whether a kind of packet is an internal register access packet, a response system packet, and a command system packet with respect to the packet received from the external module, if said packet kind is determined to be said internal register access packet, storing said packet into a first packet buffer in which a first priority has been set, if said packet kind is determined to be said response system packet, storing said packet into a second packet buffer in which a second priority has been set, and further, if said packet kind is determined to be said command system packet, storing said packet into a third packet buffer in which a third priority has been set; and a packet transmitting requesting arbiter for, in the transfer waiting state where the command system packet to a certain transmission destination has been stored in said third packet buffer, in the case where the response system packet to another transmission destination is received from said external module and stored in said second packet buffer, withdrawing the transfer waiting state of the command system packet of the low priority stored in said third packet buffer and transmitting the response system packet of the high priority stored in said second packet buffer, and said packet receiving function unit comprises:

a reception packet priority discriminating unit for discriminating whether a kind of packet is the internal register access packet, the response system packet, or the command system packet with respect to the packet received from another packet transmitting/receiving unit, if said packet kind is determined to be said internal register access packet, storing said packet into the first packet buffer in which the first priority has been set, if said packet kind is determined to be said response system packet, storing said packet into the second packet buffer in which the second priority has been set, and further, if the packet kind is determined to be said command system packet, storing said packet into the third packet buffer in which the third priority has been set; and a packet receiving request arbiter for, in a response inhibiting state of said transmission permission caused by an error of the external module, only in the case where the transmitting request of said internal register access packet of the highest priority is received, making a response of the transmission permission, receiving the internal register access packet, and returning error detail information packet showing an error state of the external module.

6. An apparatus according to claim 5, wherein in the response inhibiting state of said transmission permission caused by the error of the external module, after a packet transmitting request is received from the other transmitting/receiving module, in the case where said packet transmitting request is withdrawn and the withdrawn packet transmitting request is subsequently again issued, said packet receiving request arbiter determines that said request is the transmitting request of said internal register access packet of the highest priority, and makes a response of the transmission permission.

* * * * *

UNITED STATES PATENT AND TRADEMARK OFFICE
CERTIFICATE OF CORRECTION

PATENT NO. : 6,957,273 B2
APPLICATION NO. : 09/725672
DATED : October 18, 2005
INVENTOR(S) : Terumasa Haneda et al.

It is certified that error appears in the above-identified patent and that said Letters Patent is hereby corrected as shown below:

Column 17, Line 57, after "received" insert - - , - -.

Signed and Sealed this

Eighteenth Day of July, 2006

JON W. DUDAS
*Director of the United States Patent and Trademark Office*